United States Patent [19]
Guscott et al.

[11] Patent Number: 4,728,936
[45] Date of Patent: Mar. 1, 1988

[54] CONTROL AND DISPLAY SYSTEM

[75] Inventors: John K. Guscott, Lynnfield; Aaron A. Galvin, Cambridge, both of Mass.

[73] Assignee: ADT, Inc., Parsippany, N.J.

[21] Appl. No.: 850,986

[22] Filed: Apr. 11, 1986

[51] Int. Cl.$^4$ .......................... G08B 25/00; G09G 3/02
[52] U.S. Cl. ................... 340/525; 340/365 R; 340/365 VL; 340/712; 340/815.07
[58] Field of Search ............ 340/525, 365 R, 365 VL, 340/716, 712, 802, 815.06, 815.07; 350/330, 331 R, 334; 200/5 R

[56] References Cited

U.S. PATENT DOCUMENTS

| | | | |
|---|---|---|---|
| 4,017,848 | 4/1977 | Tannas, Jr. | 340/712 |
| 4,078,257 | 3/1978 | Bagley | 340/712 |
| 4,275,385 | 6/1981 | White | 340/525 |
| 4,313,108 | 1/1982 | Yoshida | 340/712 |

FOREIGN PATENT DOCUMENTS

2019628  10/1976  United Kingdom ................ 340/715

*Primary Examiner*—Donnie L. Crosland
*Attorney, Agent, or Firm*—Weingarten, Schurgin, Gagnebin & Hayes

[57] ABSTRACT

A control and display system for an electronic security system which comprises a thin flat multilayer panel which provides a touchpad for entry of data and display areas for the selective display of messages and legends. The system is contained within a small wall mounted housing which includes a microprocessor controller cooperative with the panel. The system operates as a data terminal in communication with a master control unit and is operative in response to touchpad actuation for providing data to the remote unit, and it is operative in response to data received from the remote unit for actuating displays and associated annuciators. The system is programmable via the front panel, and input and display modes can be tailored to suit particular operational requirements.

19 Claims, 8 Drawing Figures

```
ENTER PASSCODE   TEST
PROTECTION ON OFF REENTER      —30
BYPASS OR CLEAR ZONE CODE
HISTORY AC OFF TROUBLE
START OVER NOT REPORTED
```

| ZONE 1 | PROTECT 1 AWAY | FIRE 2 DELAY | MODIFY 3 SYSTEM | ZONE 5 |
|---|---|---|---|---|
| ZONE 2 | PROTECT 4 AT HOME | POLICE 5 INSTANT | SIREN 6 TROUBLE | ZONE 6 |
| ZONE 3 | MAIN 7 BYPASS | MEDICAL 8 CODE | LIMITED 9 TEST | ZONE 7 |
| ZONE 4 | ENTER RESET | DELETE 0 HISTORY | RETURN 10+ COPY | ZONE 8 |

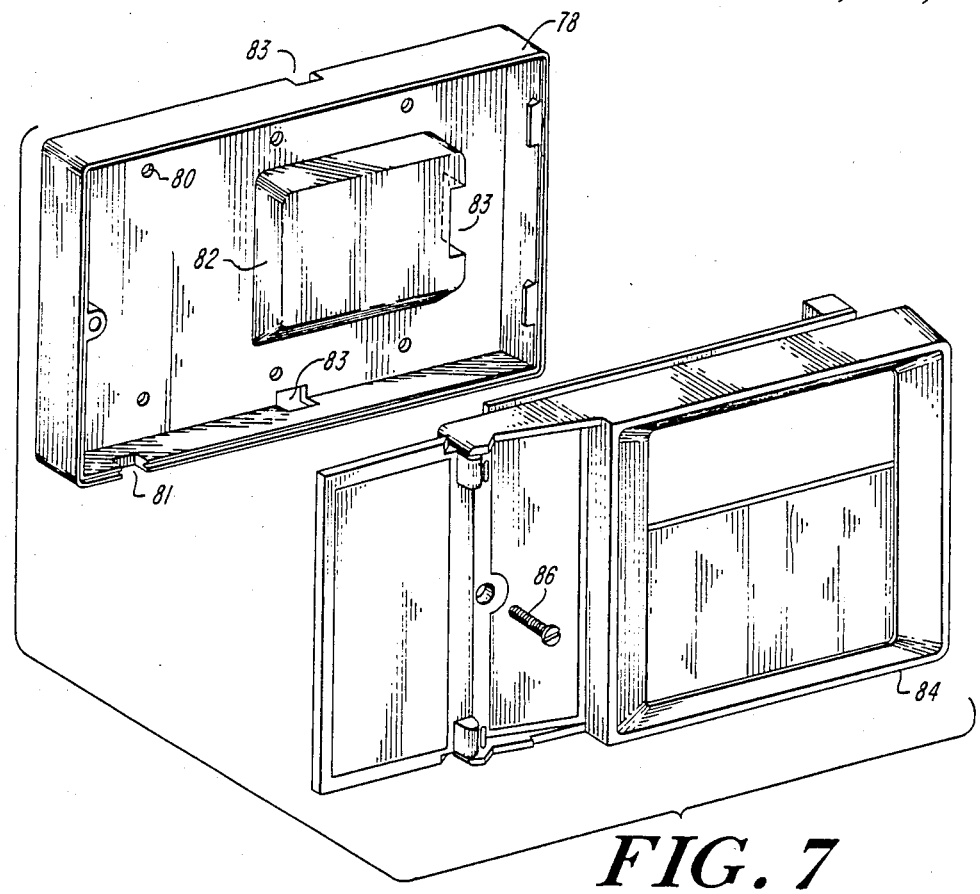
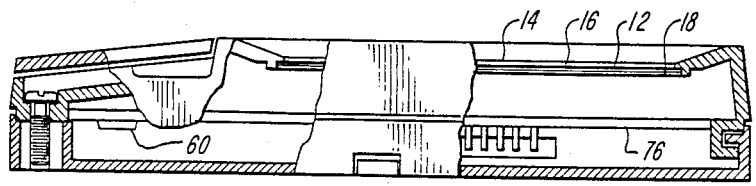
FIG. 7
FIG. 8

CONTROL AND DISPLAY SYSTEM

FIELD OF THE INVENTION

The present invention relates to interactive control systems, and in particular to keypad-based data entry and display systems.

BACKGROUND OF THE INVENTION

The keypad is often employed in modern control systems as a device for entering data or commands into the control electronics. The ubiquitous telephone-style keypad is one example. Most keypad-based control systems feature a symbolic display of alphanumerics which identifies the particular function of each key. Prior art commonly includes the alphanumerics as printed or inscribed characters on the face of each key. Such an approach limits each key to an unchanging, permanent set of characters which are thereby dedicated to their respective keys.

The limitations of the keypad are tested in modern control systems which depend upon a wealth of commands and offer many instances for data entry. Attempts to expand the number and variety of symbols associated per key have featured devices such as replacement templates and adhesive-backed labels to delineate groups of alphanumerics for each key. Such approaches continue to be inflexible, cumbersome, and not under the control of the system addressed. They do not allow the system or the user to reconfigure the symbology according to the requirements of the system operation as it changes mode. Annunciation systems based on cathode-ray or flat-panel displays are expensive and bulky attempts to allow the system to reconfigure the symbolics associated with each key by drawing from a memory cache of possible commands and data characters. However, the complexity of such combinations removes the keypad from the realm of modular, inexpensive, compact, and reliable data-entry devices. Prior art apparatus often places the symbols not on the face of the key, but elsewhere, which detracts from the simplicity and the ergonometric quality of the keypad.

SUMMARY OF THE INVENTION

In brief, the present invention provides a control and display system which is especially useful in an electronic security system and which comprises a thin, flat multilayer panel providing a touchpad for entry of data and display areas for the selective display of messages and legends. The system can be contained within a small housing which includes a microprocessor controller cooperative with the panel. The system functions as a data terminal for providing data to a remote site and for receiving data from the remote site. Each area of the panel can serve as an input pad with corresponding labels visible thereon and as a display of one or more legends or messages.

The keypad and interactive display system according to the present invention combines the keypad and display functions into one matrix of touchpads having each pad superimposed over one portion of a dynamic planar display. Each pad incorporates an active display which indicates on its face the symbols representing the utility of that pad. Command or data entry is thereby accomplished by touching the appropriate pad in response to the selection of symbols offered on the underlying display. In a preferred embodiment, each touchpad is superimposed over a section of a liquid crystal display (LCD). Together with the touchpad matrix, the display matrix forms a thin interactive panel which communicates with associated digital circuitry.

Because the display is driven by a central processing unit (CPU) utilizing random-access and read-only memories (RAM and ROM), the meaning of the symbology on the keypad/display is instantly changeable. When the invention is activated, a set of the display symbols are produced by this microprocessor-based circuitry, whereupon one or more symbols are selected by the operator, and the display is altered according to the response mode of the control system. Thus, the display interacts with the operator. The invention is capable of displaying more information within each key than can be accomplished otherwise. Furthermore, the capability for display within each key is such that additional display devices are made unnecessary. The invention thereby combines the attributes of the touch-sensitive key and the dynamic display into a compact device having an area no larger than the traditional keypad.

The invention contemplates the preferred embodiment of the display and keypad as a panel of sandwiched layers, comprised of a touch-sensitive matrix of pads, a LCD, an optical layer of graphics, and an electroluminescent panel for back-lighting the symbols within the LCD or graphics layer. The invention also contemplates that the panel be interconnected with its allied circuitry and with other such panels by way of a full-duplex line. The duplex line allows the control and display of information by a plurality of remotely-locationed panels. However, each compact panel, being separate from its control electronics, may be placed in a variety of locations or environments.

The invention in a preferred embodiment is employed for an electronic security system for providing control and annunciation functions for the system. The invention is preferably housed in a small enclosure which is easily mounted to a wall or other mounting surface and which contains a touch pad, message display areas underlying the touch pad, message display areas underlying the touch pad and which can be selectively displayed in accordance with particular operating modes as selected by way of the touch pad. Auxiliary, visual and audible annunciators can be included in the unit, and the electronic circuitry operative in response to commands from the touch pad and operative to provide commands for the message displays are contained within the enclosure.

DESCRIPTION OF THE DRAWINGS

These and further features of the invention will be understood from the following detailed description, taken together with the accompanying drawings, wherein:

FIG. 7 is an exploded view of the housing of FIG. 6; and

FIG. 8 is a sectional elevation view of the housing of FIGS. 6 and 7.

DETAILED DESCRIPTION OF THE INVENTION

Figures 1, 2:
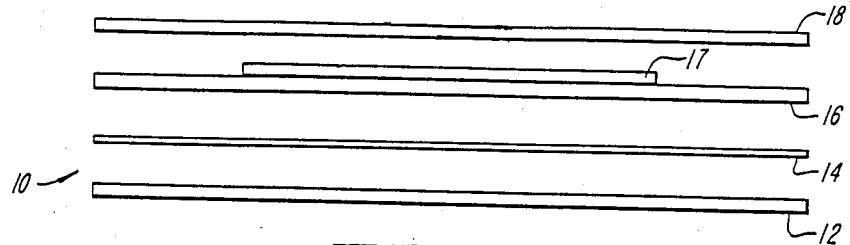
FIG. 1 is a exploded view of a touchpad/display device according to the present invention.
FIG. 2 is a front view of the touchpad/display device illustrating all symbols available for selective display.

A touch pad/display device 10 constructed and operative in accordance with the invention is shown in exploded view in FIG. 1. The device includes a transparent layer 12 containing a touchpad matrix, a layer 14 containing alphanumeric and/or graphic information, a layer 16 containing a liquid crystal layer 17 and a layer 18 which contains an electroluminescent illuminator. The layers are sandwiched together to form a laminar structure which is compact and relatively rugged. The layer 12 is the outer layer which confronts the user and the front surface of which has touchpad areas which can be touched for data entry or control purposes.

Messages to be displayed are contained on layer 14, which preferably is a rigid plastic film which can be replaced with films containing different messages to suit intended operational requirements. The messages which can be selectively displayed in the illustrated embodiment are shown in FIG. 2. An upper section 30 contains message words, and a lower section 32 is arranged in the form of a matrix of areas 34 each containing a numeral or letter and some containing word messages. Outer side areas 36 of the matrix contain additional message words.

Figure 3:
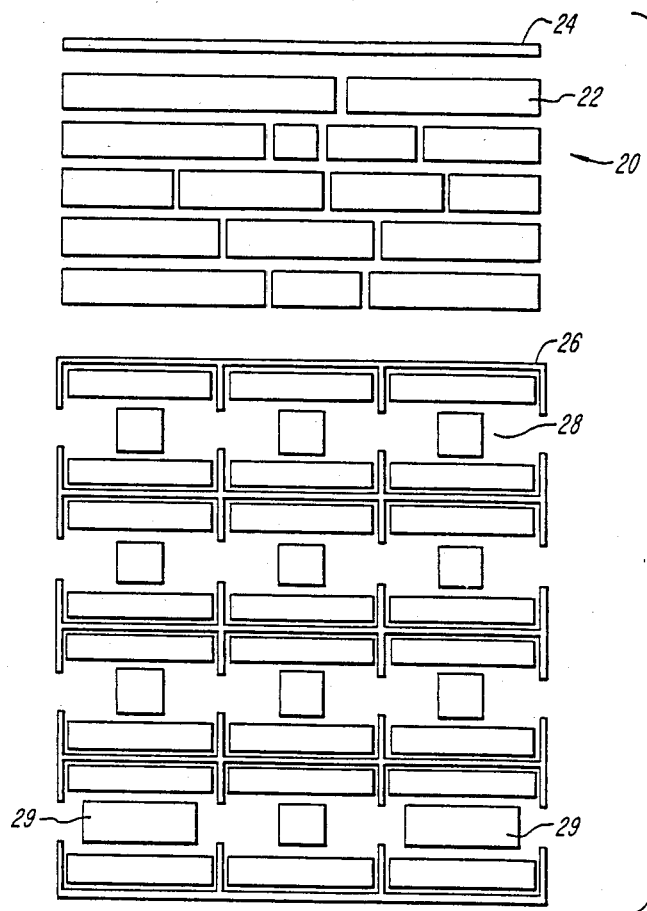
FIG. 3 is a front view of the liquid crystal shutter areas of the touchpad/display device.

The layer 17 contains liquid crystal areas which are in registration with corresponding message areas 34 of layer 14. These liquid crystal areas act as optical shutters to selectively occlude light from the electroluminescent layer 18 so that the displayed messages of the non-shuttered areas will be visible. The liquid crystal areas are depicted in FIG. 3 and include a message section 20 at the upper portion of the layer containing areas 22 arranged to be in registration with the respective messages of the sheet 14. The shutter areas are of a size to accommodate the particular associated messages. A narrow strip 24 and strips 26 serve as a part of a grid pattern which delineates the respective areas of the resultant display. Areas 28 are arranged in the matrix pattern illustrated and have shutter areas 29 in registration with the matrix areas 34 of layer 14 for shuttering of these areas. The areas 29 are of different shuttering patterns in accordance with the associated messages contained in areas 34 of layer 14.

Figure 4:
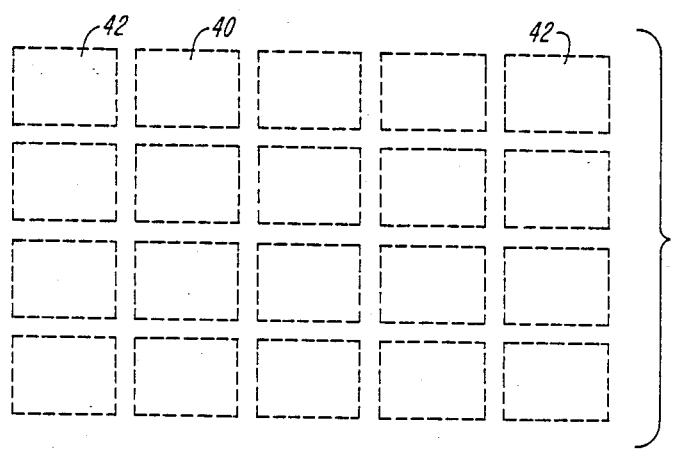
FIG. 4 is a front view of the touchpad matrix of the touchpad/display device.

The touchpad matrix of layer 12 is depicted in FIG. 4 and includes areas 40 in alignment with respective areas 28 of the liquid crystal layer 17 and the message areas 34 of layer 14. The touch sensitive areas of the touchpad matrix are of transparent film form and are connected to printed circuit paths by which the touchpad areas can generate corresponding electrical signals or codes for entry to the associated circuitry. The areas 42 at the outer sides of the touchpad matrix are in registration with the associated areas 36 of the layer 14, but no liquid crystal shutters are provided for these outer areas.

The touchpad is formed on a glass substrate, as is the liquid crystal shutter configuration. All of the layers sandwiched onto the rear electroluminescent layer are transparent, and the laminated structure is retained within a frame which is mounted such as by standoffs on a circuit board (FIG. 8). The circuit board and laminated panel structure are housed within the enclosure typically as shown. The liquid crystal areas can be coupled to the circuit board by a conductive resilient material such as that known as Zebra rubber and by which the LCD shutter areas are electrically connected to the circuit board for selective energization. The touch pad can be connected to the circuit board by a flexible printed wiring board to provide connection of the touchpad areas.

Figure 5:
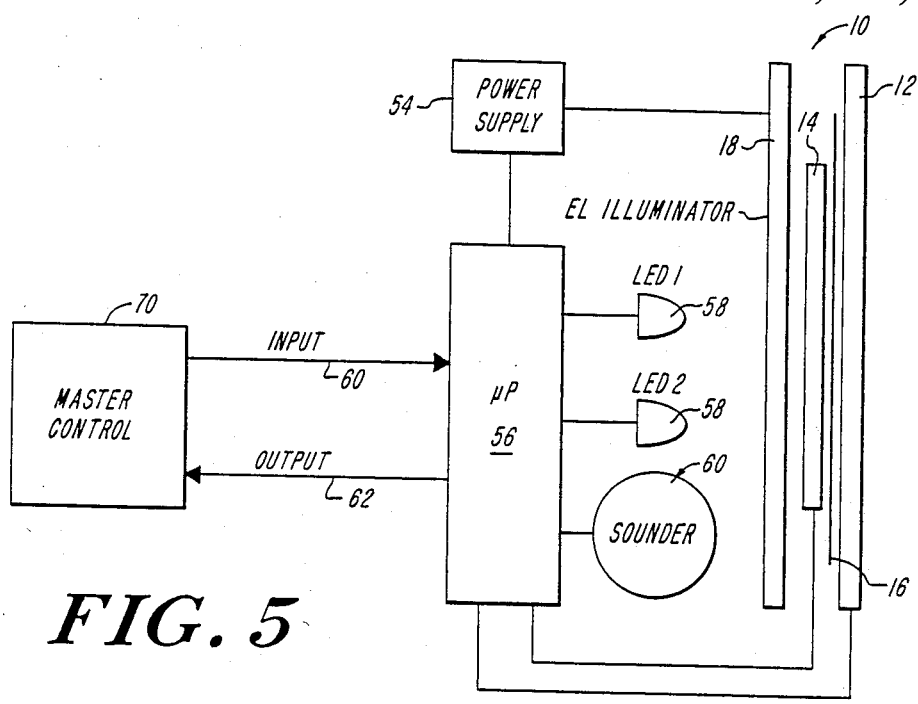
FIG. 5 is a block diagram of the control circuitry of the invention.

The control circuitry is shown in FIG. 5 and includes a microprocessor 56 which is energized by a power supply 54 and which provides driving signals to the shutters of layer 14, and which receives signals from the touchpad areas of layer 12. The power supply 54 is also operative to energize the electroluminescent layer 18. The microprocessor also drives LED's 58 and sounder 60. The microprocessor is in communication with a master control 70 which in an alarm system is typically a control panel for the system. Data from the master control is provided to the microprocessor on line 60, while data from the microprocessor to the master control is provided on line 62.

The microprocessor 56 is operative to sense the actuation of any of the touchpads and to generate a serial code in response to and representative of the actuated pad. To minimize spurious outputs, the signal derived from the actuated pad is debounced by the microprocessor before providing a valid output code. Each valid touchpad actuation produces a beep on the sounder 60 to denote touchpad actuation. If at the time of touchpad actuation the sounder is already providing a continuous tone, as could occur during an alarm or trouble state, then touchpad actuation will produce a louder beep to momentarily take priority over the continuous tone. The sounder thereby provides audible feedback to the operator in response to touchpad inputs, and is also employed for alerting the user to system status or trouble. The sounder 60 has a dual amplitude dual frequency capability to provide a softer sound, or a relatively louder sound, and each of which can be operated in a continuous or pulsed mode.

The microprocessor can drive the liquid crystal shutters to achieve different display modes. The displays can be driven to be steady-on or blinking, and during periods of inactivity, the microprocessor can issue commands to blank the display. The blank display, which can be reactivated upon touching of any touchpad area, provides a deadfront appearance to the display area, and protects the electroluminescent panel from sunlight.

The unit is programmed from the front panel, and the particular operational inputs and outputs are readily changeable by software changes in the microprocessor 56 and changes are necessary in the message display. The unit operates in a setup or initialization mode, and in an operating mode. Messages are displayed which are associated with the particular mode and in accordance with the particular keyboard entry or function in use. A user can be prompted through a sequence of inputs by appropriate displays presented to the user. Eight of the touch sensitive pads 42 (FIG. 4) in the illustrated embodiment are not backed up by LCD shutters, but are continuously illuminated by the electroluminescent light. The outer pads 42 are used during the initialization mode for setup commands. These setup commands are typically set forth in a separate list or can be provided in an overlay over the display area or in displayed setup legends. During the operating mode the pads 42 are employed in pairs and these touchpad areas 42 must be simultaneously actuated in pairs to provide a valid emergency input. This dual actuation is employed to signal an alarm or other emergency condition and minimize the opportunity for inadvertent alarm signalling. Actuation of the two areas concurrently within a defined overlap time is interpreted by the microprocessor as a valid dual pad input to cause the generation of a corresponding code sequence for the combination of touchpad areas which have been actuated.

The unit functions as an intelligent terminal in communication with a master control 70 such as an alarm system control panel, and provides input commands to the master control and output displays and indications on command from the master control. Commands entered via the touchpad are conveyed to the master control for receipt and response, while commands sent from the master control are received by the microprocessor 56 for display and annunciation as applicable. In the presently preferred embodiment, data transmission is accomplished by serial asynchronous transmission. Data command sequences are stored in memory tables of the microprocessor 56. The microprocessor memory includes a repertory of commands for selective driving of each of the shutter areas of the display and for driving the LEDs 58 and sounder 60. The microprocessor memory also stores a repertory of data or commands which are provided in response to inputs from actuated touchpad areas.

Typically red and yellow LED's are provided for supplemental annunciation. In the event of a trouble condition, the yellow LED 58 is caused to blink, and the trouble message on the display is rendered visible. Actuation by a user of the touchpad are bearing the trouble label cause display of an identifying number which can then be looked up in the trouble label inside the door 74 to ascertain the nature of the trouble condition. Actuation of the red LED 58 denotes an alarm condition which will also cause actuation of the sounder 60 and actuation of an alarm legend on the display. The microprocessor software can be configured to accommodate the particular messages and legends provided on a particular display, and also to drive the sounder and LED indicators in intended manner to suit the particular operational requirements.

Figure 6:
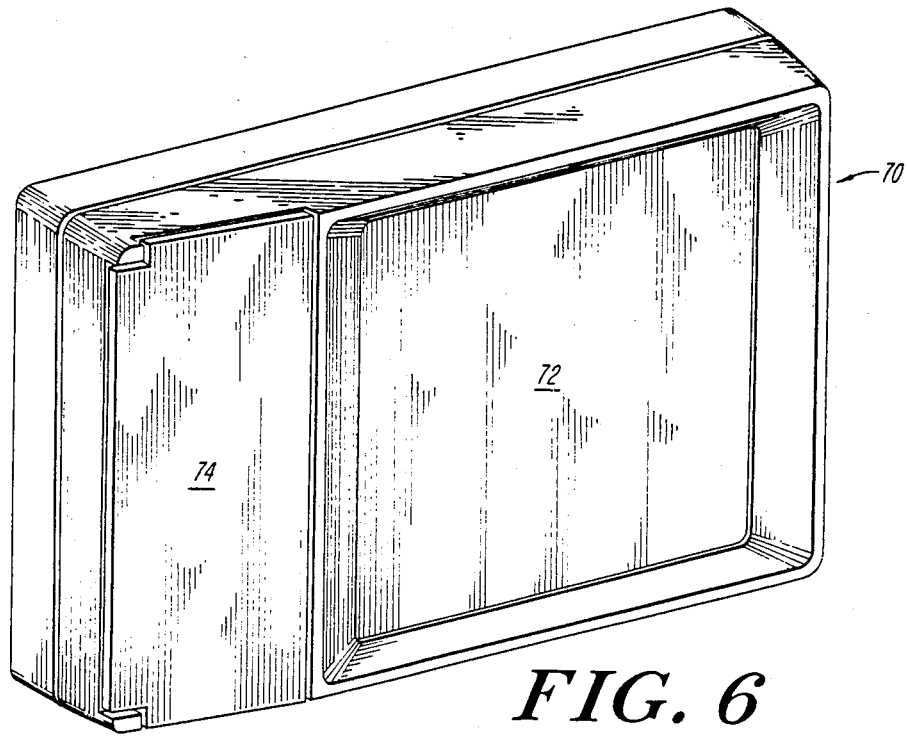
FIG. 6 is a perspective view of the invention shown in a housing adapted for mounting on a wall or other mounting surface.

The device is contained in a small enclosure shown in FIGS. 6–8. The enclosure 70 includes a generally rectangular housing having a window area 72 which contains the multilayer panel described above. An area to one side of the display window includes a door 74 which can be opened to provide access to directory labels therein. For example, a first label can contain zone identification, and a second label inside the door can contain a list of trouble conditions. The door can be spring loaded to remain in an open or closed position. The associated electronic circuitry is included on a circuit board 76 contained within the housing. The housing includes a rear section 78 which can be attached to a wall or other mounting surface and which includes mounting holes 80 and an inwardly recessed portion 82 for accommodation of wiring connectors such as wire nuts employed in connecting system wiring. Breakout areas 83 are provided for wiring access. The front section 84 of the housing is secured to the rear section by machine screws 86 or other fasteners.

The LED's 58 (FIG. 5) are mounted on the circuit board and are disposed behind the window area 72 for supplemental annunciation. As described, the LED's are of distinguishable color and can be energized in steady or blinking state in response to commands. The audible sounder is also mounted in the circuit board to provide audible feedback to an operator in response to touchpad inputs, and also to provide alert sounds to indicate system status or trouble. The sounder transmits sound via a port 81 provided in the housing wall.

The invention is not to be limited by what has been particularly shown and described as indicated in the appended claims.

What is claimed is:

1. An interactive display system comprising:
   a first layer containing touchpad areas providing electrical signals representative of respectively actuated areas;
   a second layer containing messages in registration with respective ones of the touchpad areas of the first layer;
   a third layer containing liquid crystal areas in registration with respective ones of the message areas of the second layer;
   a fourth layer containing an electroluminescent illuminator; and
   means for retaining the layers in laminated disposition.

2. The system of claim 1 wherein the touchpad areas are transparent.

3. The system of claim 1 wherein the touchpad areas are arranged in a matrix of areas.

4. The system of claim 1 wherein the second layer includes a matrix area containing alphanumeric information, a first contiguous area containing message data, and at least one second contiguous area containing additional message data.

5. The system of claim 4 wherein the third layer is in registration with only a portion of the message areas of the second layer.

6. A control and display system comprising:
   a thin flat multilayer panel providing a touchpad for entry of data and display areas for the selective display of message data;
   a housing containing the multilayer panel and having a window area for access to the touchpad and display areas;
   control circuitry disposed in the housing and including a microprocessor controller cooperative with the panel for selective energization of the display areas and for decoding of touchpad actuation wherein at least some of the selectively energized display areas are in registration with said touchpad; and
   means for coupling the microprocessor to a remote master control for data transmission between the microprocessor and master control.

7. The system of claim 6 wherein the housing includes a window area in which the multilayer panel is disposed;
   an area contiguous to the window area and containing visual system data and a door for selectively uncovering the contiguous area.

8. The system of claim 6 wherein the housing includes a rear section attachable to a mounting surface, and a front section attachable to the rear section and having a circuit board mounted therein to which the panel is attached.

9. A display and control for an electronic security system comprising:
   a housing adapted for attachment to a mounting surface and having a window area visible to a user;

control circuitry in the housing including a microprocessor and memory means;

a multilayer flat panel disposed in the window area of the housing and having transparent touch sensitive keypads coupled to the control circuitry and operative upon manual actuation to enter data into the memory of the control circuitry;

display areas at least some of which are in registration with the touchpad areas and coupled to the control circuitry for selective activation to provide selective visual displays in the window area.

10. The invention of claim 9 wherein the window area is blank when no messages are to be displayed.

11. The invention of claim 9 wherein portions of the window area provide touchpad input functions and display functions.

12. The invention of claim 9 wherein the control circuitry is coupled to a remote unit for communication of data therebetween.

13. The invention of claim 9 wherein the control circuitry is operative to decode inputs from the keypads and actuate corresponding messages on the display and to provide coded data for transmission to a remote unit in response to selected keypad actuation, and operative in response to data from a remote site to display messages and provide data in response thereto.

14. The invention of claim 9 further including visual indicators in the housing and visible via the window area and operative in response to actuation by the control circuitry to denote trouble and status conditions.

15. The invention of claim 14 further including an audible indicator in the housing and operative upon actuation by the control circuitry to audibly denote trouble and status conditions.

16. The invention of claim 15 wherein the audible indicator is operative to sound during each keypad actuation to provide audible feedback to a user.

17. The invention of claim 9 wherein the control circuitry is programmable via the keypad to establish intended operating conditions.

18. The invention of claim 9 wherein the control circuitry is programmable via the keypads to energize the display areas in selected intended manner.

19. The invention of claim 9 wherein the window area includes a matrix area having keypads for data entry and superimposed message areas for selective display.

* * * * *